US009567065B2

(12) United States Patent
Coote et al.

(10) Patent No.: US 9,567,065 B2
(45) Date of Patent: Feb. 14, 2017

(54) VEHICLE ARMREST

(75) Inventors: David John Coote, London (GB); Oliver Trevor Horton, London (GB)

(73) Assignee: BAE SYSTEMS plc, London (GB)

(*) Notice: Subject to any disclaimer, the term of this patent is extended or adjusted under 35 U.S.C. 154(b) by 1403 days.

(21) Appl. No.: 12/900,109

(22) Filed: Oct. 7, 2010

(65) Prior Publication Data

US 2012/0085870 A1    Apr. 12, 2012

(51) Int. Cl.
*B64C 13/04* (2006.01)
*B60N 2/46* (2006.01)
*G05G 1/02* (2006.01)
*G05G 1/08* (2006.01)
*G05G 9/047* (2006.01)

(52) U.S. Cl.
CPC ............. *B64C 13/04* (2013.01); *B60N 2/4693* (2013.01); *G05G 1/02* (2013.01); *G05G 1/08* (2013.01); *G05G 9/047* (2013.01); *Y10T 74/20201* (2015.01); *Y10T 74/20396* (2015.01)

(58) Field of Classification Search
CPC ......... B60N 2/4693; B64C 13/04; G05G 1/02; G05G 9/047; G05G 1/08; Y10T 74/20396; Y10T 74/20201
USPC ......... 244/220, 221, 223, 234, 118.6, 122 R, 244/141; 248/118; 74/491, 471; 345/161
See application file for complete search history.

(56) References Cited

U.S. PATENT DOCUMENTS

| 3,703,931 | A | * | 11/1972 | Page et al. | 172/4.5 |
|---|---|---|---|---|---|
| 4,517,424 | A | * | 5/1985 | Kroczynski | 200/52 R |
| 4,849,732 | A | * | 7/1989 | Dolenc | 341/20 |
| 4,971,465 | A | * | 11/1990 | Hashimoto | 400/485 |
| 5,379,663 | A | | 1/1995 | Hara | |
| 5,481,263 | A | * | 1/1996 | Choi | 341/20 |
| 5,566,778 | A | | 10/1996 | Valier et al. | |
| 5,982,356 | A | * | 11/1999 | Akiyama | 345/161 |
| 6,148,593 | A | | 11/2000 | Heinsey et al. | |
| 6,529,125 | B1 | * | 3/2003 | Butler et al. | 340/461 |
| 6,680,728 | B1 | * | 1/2004 | Lilenfeld | 345/156 |
| 6,880,855 | B2 | * | 4/2005 | Chernoff et al. | 280/778 |
| 6,928,350 | B2 | * | 8/2005 | Melnyk et al. | 701/36 |
| 7,018,158 | B2 | * | 3/2006 | Amamiya et al. | 414/636 |
| 7,277,083 | B2 | * | 10/2007 | Duncan | 345/156 |
| 7,302,322 | B1 | * | 11/2007 | Szczerba et al. | 701/34.4 |
| D566,132 | S | * | 4/2008 | Mack | D15/11 |
| 7,379,052 | B1 | * | 5/2008 | Dellenger | 345/167 |
| 2001/0035856 | A1 | * | 11/2001 | Myers | 345/156 |

(Continued)

FOREIGN PATENT DOCUMENTS

DE    36 26 898 A1    2/1988
DE    94 10 223 U1    8/1994

(Continued)

OTHER PUBLICATIONS

United Kingdom Search Report for GB 0917448.3 dated Dec. 16, 2009.

(Continued)

*Primary Examiner* — Tien Dinh
*Assistant Examiner* — Assres H Woldemaryam
(74) *Attorney, Agent, or Firm* — Finch & Maloney PLLC

(57) ABSTRACT

An armrest for use by a pilot while operating a side stick inceptor has on its underside a number of secondary controls which can be operated when the side stick is not being used, the armrest then acting as a handgrip enabling the pilot to operate the secondary controls with a steady hand.

17 Claims, 3 Drawing Sheets

(56) References Cited

U.S. PATENT DOCUMENTS

| | | | |
|---|---|---|---|
| 2002/0023986 A1* | 2/2002 | Nicholson | 248/118 |
| 2002/0109388 A1* | 8/2002 | Magnuson | 297/411.38 |
| 2002/0125379 A1* | 9/2002 | Money et al. | 248/118 |
| 2004/0031667 A1* | 2/2004 | Dinkel et al. | 200/5 A |
| 2006/0025217 A1* | 2/2006 | Hussaini et al. | 463/36 |
| 2006/0042857 A1* | 3/2006 | Catton et al. | 180/334 |
| 2006/0061122 A1* | 3/2006 | Billger et al. | 296/65.07 |
| 2007/0275771 A1 | 11/2007 | Lee et al. | |
| 2008/0011905 A1* | 1/2008 | Guering | 244/228 |
| 2008/0208396 A1* | 8/2008 | Cairola et al. | 701/3 |
| 2009/0177128 A1* | 7/2009 | Fukuyama et al. | 601/98 |

FOREIGN PATENT DOCUMENTS

| | | |
|---|---|---|
| DE | 197 25 175 A1 | 12/1998 |
| DE | 20 2006 004 965 U1 | 6/2006 |
| EP | 0 503 801 A2 | 9/1992 |
| EP | 0 695 664 A1 | 2/1996 |
| FR | 2 889 125 A3 | 2/2007 |
| GB | 2 201 758 A | 9/1988 |
| JP | 11-338568 A | 12/1999 |

OTHER PUBLICATIONS

European Search Report for EP 09275096.7 dated Mar. 8, 2010.
Notification Concerning Transmittal of International Preliminary Report on Patentability (Forms PCT/IB/326 and PCT/IB/373) and the Written Opinion of the International Searching Authority (Form PCT/ISA/237) issued on Apr. 19, 2012, in corresponding International Application No. PCT/GB2010/051681. (7 pages).

\* cited by examiner

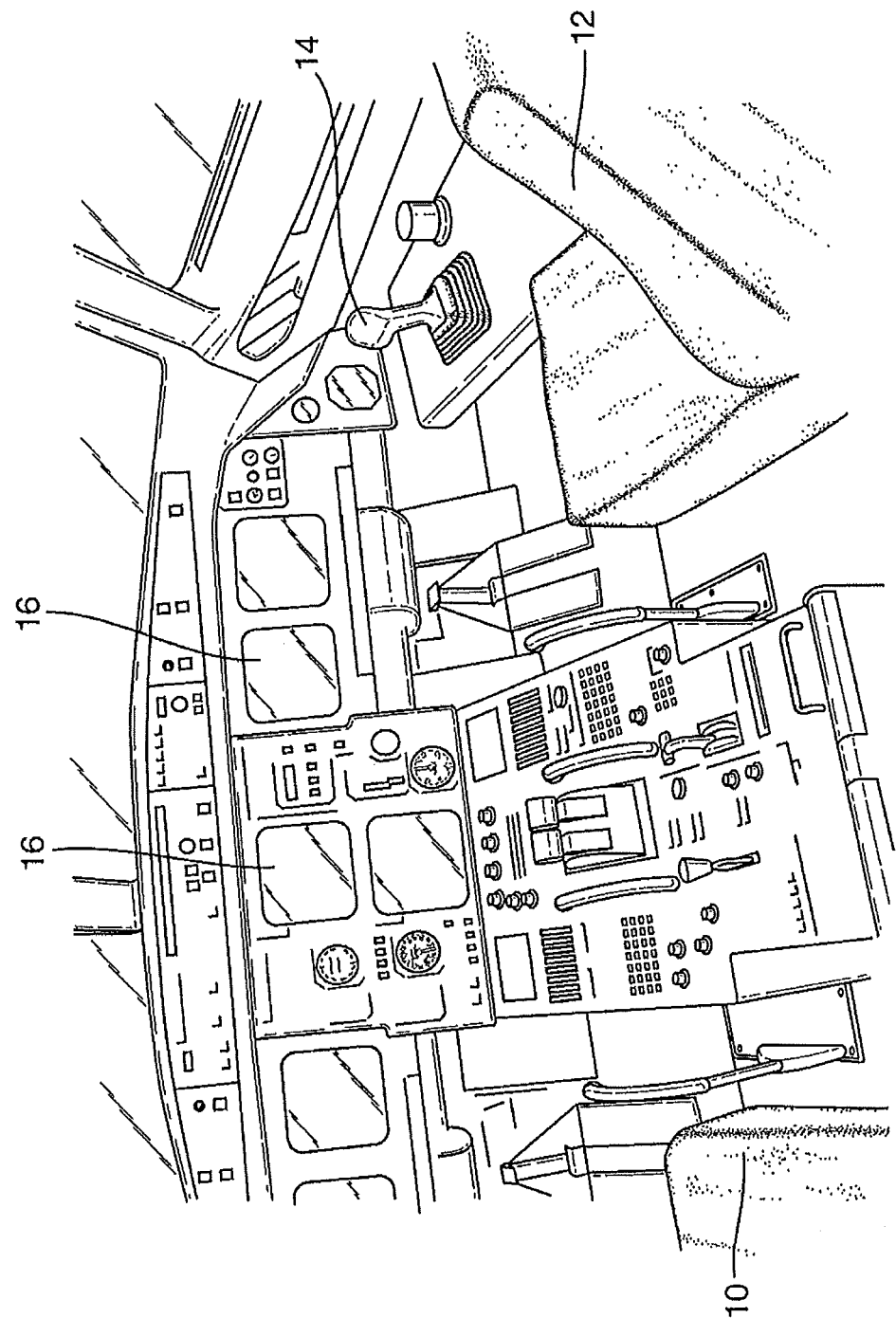

VEHICLE ARMREST

This invention relates to a vehicle armrest for an occupant of the vehicle. In a preferred embodiment it relates to a combined handgrip and armrest for a flight-crew member of an aircraft.

In many modern aircraft cockpit designs, the control yokes/wheels traditionally located in front of the pilot and co-pilot for primary flight control in roll and pitch are replaced by small sidestick inceptors placed to the side of the pilot/co-pilot, usually in the outboard panelling of the cockpit. Use of such an inceptor for an extended period can cause strain the operator's shoulder and arm, unless adequate support is provided e.g. in the form of an armrest.

Also in modern cockpit designs, secondary controls are installed on a variety of panels around the flight crew seating stations. In a "glass cockpit" individual controls corresponding to each instrument are not necessary, and generic "point and click" controls operating a cursor on a screen provide more flexibility using fewer controls. However, the vibration and turbulence which may be encountered during flight can make it difficult for aircrew to operate such controls accurately.

These problems may also arise in other vehicles, e.g. armoured fighting vehicles or high-speed watercraft, in which a number of controls must be operated in conditions of vibration or turbulence.

In a first aspect of the invention, there is provided a vehicle armrest for a forearm of an occupant of the vehicle, comprising a first surface facing generally upwardly towards the occupant and positioned to support said forearm, and a second surface facing in an opposite direction to the first surface generally downwardly away from the occupant, wherein the armrest has a handgrip configured to be grasped for support by an occupant of the vehicle, and the second surface is provided with at least one control operable by the occupant for controlling the vehicle whilst grasping the hand grip for support.

The vehicle occupant thus is provided with a handgrip which can steady his hand whilst he operates the controls. That is the handgrip provides a location at which the occupant can at least temporarily fix the frame of reference relative to vehicle so that during turbulence or other movement of the vehicle, the occupant can accurately operate the vehicle control or controls.

The disposition of the controls on the armrest in this manner enables the occupant both to support his forearm and to steady his hand whilst operating the controls.

The armrest may be positioned within the vehicle so as to support the occupant's forearm whilst he operates a primary control inceptor of the vehicle.

It then can have the dual function of providing support for the occupant whilst operating the primary control inceptor, and of accommodating the other controls in a convenient manner for operation by the occupant when he is not manipulating the primary control inceptor, e.g. whilst acting as co-pilot. In known arrangements, such controls have to be accommodated elsewhere if an armrest is to be provided.

By placing the controls on a surface which does not face towards the occupant a more convenient and comfortable grip can be provided.

The at least one control may be disposed at an end of the armrest away from an occupant for operation by a digit of the occupant.

The further, or second, surface is provided with a plurality of said controls operable by respective digits of an occupant.

The at least one control may comprise a push-button and or a scroll wheel and/or a joystick. The joystick may be positioned for operation by a thumb of the occupant.

The further surface may comprise at least one groove for receiving a finger of the occupant.

A said pushbutton or scroll wheel may be disposed in the groove.

The invention now will be described merely by way of example with reference to the accompanying drawings, wherein:

FIG. 1 shows a typical modern aircraft flight deck or cockpit;

Figure 2A:
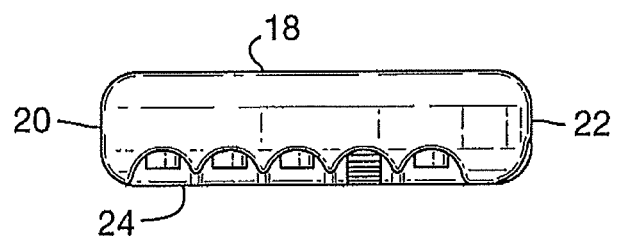
FIGS. 2a-2c show in three orthogonal views a combined armrest and handgrip according to the invention.

Referring to FIG. 1, there is shown a typical modern aircraft cockpit, here of a twin-engine commercial airliner. As is customary, major controls and instruments are duplicated on each side of the aircraft centre-line, so that the aircraft can be flown from either the left-hand (captain's) seat 10 or the right-hand (co-pilot's) seat 12. Each pilot is provided with a primary flight control inceptor or sidestick 14 disposed outwardly of his seat towards the outboard side of the cockpit. In front of the pilot are provided multi-function screens 16, some of the displays available on them being controlled by minor controls at various locations in the cockpit. No armrest is provided for the pilot's forearm whilst operating the side stick 14, and the minor controls for the displays 16 have to be operated with an unsteadied hand. The problems discussed above thus are likely to arise.

Figure 2B:
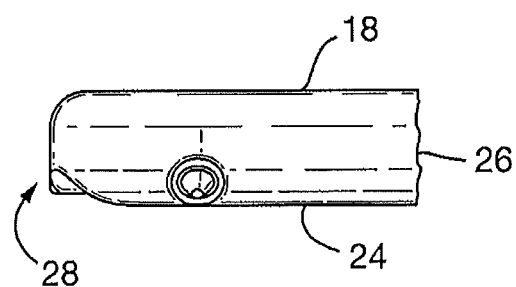
Figure 2C:
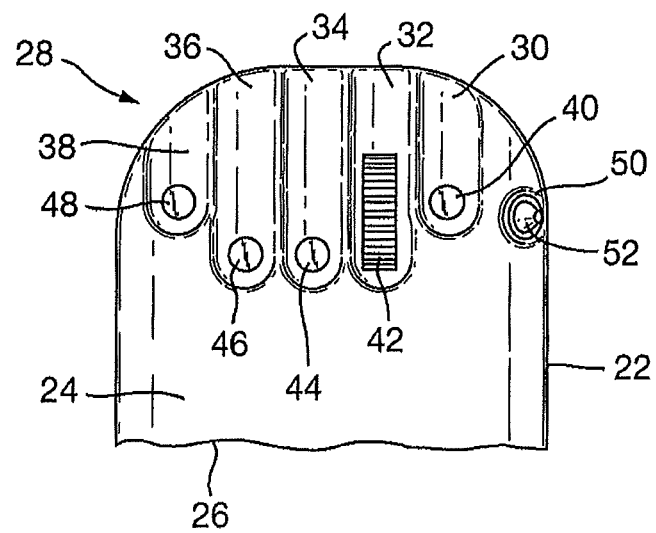
Figure 3:
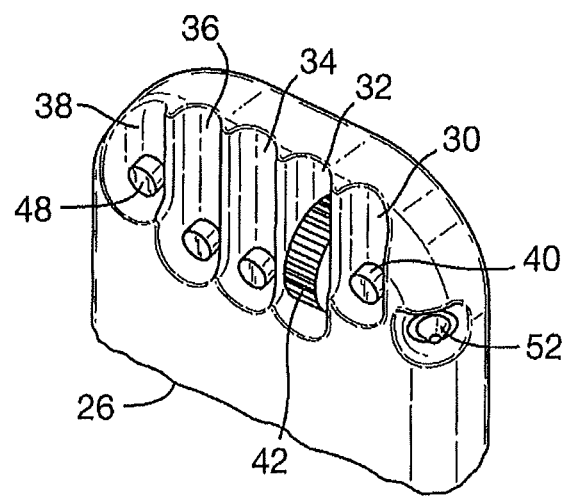
FIG. 3 is a perspective view from beneath of the armrest of FIG. 2.

FIGS. 2a-2c and 3 show the end of an armrest and handgrip according to the invention, intended to be installed to the rear of the co-pilot's side stick 14 so as to support the co-pilot's forearm when he operates the sidestick. An oppositely-handed, but otherwise identical, armrest/handgrip is provided to the rear of the captain's joystick on the left side of the cockpit.

The armrest comprises an upper surface 18 which faces generally towards the user, laterally-facing side surfaces 20, 22 and a lower surface 24 which faces directly (oppositely) away from the user. The armrest has a proximal end closest to the user and a distal end 28 remote from the user. The armrest is only partially shown in FIGS. 2a-2c and 3; it extends rearwardly from its distal end at 26 to its proximal end (not shown) which is fixed to a suitable mounting on the user's seat or on adjacent structure in the cockpit. The length of the armrest is such as to support the entire length of the user's forearm. The upper and lower surfaces 18, 24 adjacent the distal end 28 of the armrest form a handgrip portion around which the user can curl his fingers so as to grasp the handgrip between his fingers and the ball of this thumb.

The armrest has the further function of providing a convenient location for a number of secondary controls.

The lower surface 24 has at its distal end a number of grooves (here five) 30, 32, 34, 36 and 38 shaped to receive the user's fingers. Each groove contains a respective control inceptor. Thus groove 30 contains a push button 40 for operation by the user's index finger, groove 32 contains a scroll wheel 42 also for operation by the user's index finger, and grooves 34, 36, 38 contain further buttons 44, 46, and 48 for operation by the user's middle, ring and little fingers. A recess 50 in the side surface 22 contains a small joystick 52 operable the user's thumb. The joystick can be tilted in two dimensions (four directions) and also can be depressed to operate a push-to-make switch. It thus conveniently can be used to manipulate a cursor on a display screen in a point-and-click mode. Alternatively, the push-to-make switch can be omitted, and the function provided by one of the buttons 40, 44, 46, and 48, preferably the button 40 operable by the user's index finger.

The controls on the surface 24 thus can provide control of a variety of secondary functions in the cockpit, which otherwise would require inceptors elsewhere in the pilot's workspace. The controls can be operated by the pilot who is not flying the aircraft, or by either pilot if the aircraft's autopilot is engaged.

It will be appreciated that the combined armrest and handgrip of the invention can bring a number of advantages:

support of the pilot's forearm whilst operating the primary flight control inceptor, the provision of a handgrip which supports and steadies the user's hand whilst operating secondary controls, particularly those associated with a cursor-operated display, the convenient grouping-together of a number of secondary controls in an ergonomic manner without any risk of accidental input to the sidestick, as could occur for example if they were grouped together somewhere on the side stick itself.

The invention also includes any novel feature or combination of features herein disclosed, whether or not specifically claimed. The appended abstract as filed is repeated here as part of the specification.

An armrest for use by a pilot whilst operating a side stick inceptor has on its underside a number of secondary controls which can be operated when the side stick is not being used, the armrest then acting as a handgrip enabling the pilot to operate the secondary controls with a steady hand.

The invention claimed is:

1. A vehicle armrest for a forearm of an occupant of the vehicle, comprising:
    a first surface facing generally upwardly towards an intended location of an occupant's forearm and positioned to support said forearm;
    a second surface facing in an opposite direction to the first surface generally downwardly away from the intended location of the occupant's forearm, the second surface having a plurality of grooves extending from a distal end of the armrest towards a proximal end; and
    a handgrip configured to be grasped for support by an occupant of the vehicle, each groove of the second surface having a control for operation by the occupant to control the vehicle whilst grasping the hand grip for support.

2. The armrest of claim 1, wherein each control is disposed in a respective groove at the distal end of the armrest, which is an end farthest away from an intended location of an occupant for operation by a finger of an occupant.

3. The armrest of claim 2, wherein each groove of the second surface is configured to receive a finger of the occupant for manipulating the control of the respective groove.

4. The armrest of claim 1 wherein at least one of the controls comprises:
    a push-button and/or scroll wheel.

5. The armrest of claim 1 wherein at least one of the controls comprises:
    a joystick.

6. The armrest of claim 4, wherein a said push-button, scroll wheel or other control is disposed in at least one groove for receiving a finger of an occupant.

7. A vehicle comprising:
    a vehicle armrest, the armrest being positioned within the vehicle to support an occupant's forearm during operation of a primary control inceptor of the vehicle, the armrest including:
    a first surface facing generally upwardly towards an intended location of an occupant's forearm and positioned to support said forearm;
    a second surface facing in an opposite direction to the first surface generally downwardly away from the intended location of the occupant's forearm, the second surface having a plurality of grooves extending from a distal end of the armrest towards a proximal end; and
    a handgrip configured to be grasped for support by an occupant of the vehicle, each groove of the second surface having a control for operation by the occupant to control the vehicle whilst grasping the hand grip for support.

8. The vehicle of claim 7 wherein the primary control inceptor is a side stick controller.

9. The vehicle of claim 7, wherein the vehicle is an aircraft.

10. The armrest of claim 1, comprising:
    a side surface adjacent to the first surface and the second surface, the side surface having a recess and a control disposed in the recess.

11. The armrest of claim 10, wherein the control disposed in the recess is a joystick.

12. The vehicle of claim 7, comprising:
    a side surface adjacent of the first surface and the second surface, the side surface having a recess and a control disposed in the recess.

13. The vehicle of claim 12, wherein the control disposed in the recess is a joystick.

14. The armrest of claim 1, wherein each groove of the second surface is configured to receive a substantial portion of a length along a respective finger of the occupant.

15. The vehicle of claim 7, wherein each groove of the second surface is configured to receive a substantial portion of a length along a respective finger of the occupant.

16. The armrest of claim 1, wherein each control is disposed on a distal end of a respective groove.

17. The vehicle of claim 7, wherein each control is disposed on a distal end of a respective groove.

* * * * *